United States Patent [19]

Smith, Jr.

[11] Patent Number: 5,754,755
[45] Date of Patent: May 19, 1998

[54] METHOD AND SYSTEM FOR GENERATING TEST SCRIPTS

[75] Inventor: Ross Faulkner Smith, Jr., Redmond, Wash.

[73] Assignee: Microsoft Corporation, Redmond, Wash.

[21] Appl. No.: 728,622

[22] Filed: Oct. 10, 1996

[51] Int. Cl.⁶ ............................................. G06F 11/263
[52] U.S. Cl. ................................. 395/183.14; 371/27.1
[58] Field of Search ........................ 395/183.14, 183.08, 395/702, 704; 371/27

[56] References Cited

U.S. PATENT DOCUMENTS

| | | | |
|---|---|---|---|
| 4,860,291 | 8/1989 | Damm et al. | 371/27 |
| 5,025,396 | 6/1991 | Parks et al. | 364/518 |
| 5,148,366 | 9/1992 | Buchanan et al. | 364/419 |
| 5,159,687 | 10/1992 | Richburg | 395/700 |
| 5,455,938 | 10/1995 | Ahmed | 371/27 |
| 5,479,414 | 12/1995 | Keller et al. | 371/27 |
| 5,495,571 | 2/1996 | Corrie, Jr. et al. | 395/183.14 |
| 5,544,298 | 8/1996 | Kanavy et al. | 395/155 |
| 5,572,643 | 11/1996 | Judson | 395/793 |
| 5,572,668 | 11/1996 | See et al. | 395/183.14 |
| 5,633,879 | 5/1997 | Potts et al. | 371/27.1 |
| 5,657,438 | 8/1997 | Wygodny et al. | 395/180 |
| 5,669,000 | 9/1997 | Jessen et al. | 395/704 |

OTHER PUBLICATIONS

*Using Microsoft Word*, Word Processing Program Version 3 for IBM Personal Computers and Compatibles, 1986 Copyright Microsoft Corporation 1983, 1985, 1986.

*Primary Examiner*—Robert W. Beausoliel, Jr.
*Assistant Examiner*—Scott T. Baderman
*Attorney, Agent, or Firm*—Seed and Berry LLP

[57] ABSTRACT

A method and system in a computer system for generating an application-specific test script file. The application-specific test script file contains test instructions for testing an application program. The system receives a test template file that has test instructions that contain placeholders. The placeholders indicate where application-specific placeholder values are to be logically inserted into the test template file. The system receives an ordered list of customizing files that have application-specific placeholder values. The system then searches the customizing files according to the ordered list for a first placeholder value for each placeholder of the test instruction. When such a placeholder value is found, the system replaces the placeholder with the placeholder value in the test instruction and stores the test instruction into the application-specific test script file.

31 Claims, 5 Drawing Sheets

Fig. 1

201     [TEMPLATE]

202     ##INCLUDE "WORD.INC" ~
203     ##INCLUDE "EXCEL.INT"
204     ##INCLUDE "COMMON.INC"

205     Sub Auto_Open()

206     Dim szTestDescription As String        'Holds description of test
207     Dim szApplicationName As String        'Holds name of an application program 208     szTestDescription = [{SCRIPT_COMMENT}]

209     szApplicationName = [{APPLICATION }]

210     ##FOR [{OBJECT*}] = 1 to 10
211         insert [{OBJECT*}]
212         Debug.Print [{OBJECT*}]
213     ##NEXT 214     ##IF [{SPELLCHECKER}] # = # "TRUE" THEN
215         [{SPELLTEST}]
216     ##ENDIF

*Fig. 2*

3A1 [DATA] (COMMON.INC)

3A2 SCRIPT_COMMENT = "TESTSCRIPT"

3A3 SPELLCHECKER = "FALSE"

*Fig. 3A*

3B1 [DATA] (EXCEL.INC)

3B2 APPLICATION = "EXCEL"
3B3 OBJECT1 = "MICROSOFT WORD DOCUMENT"
3B4 OBJECT2 = "MICROSOFT WORD PICTURE"
3B5 OBJECT3 = "MICROSOFT POWERPOINT SLIDE"

*Fig. 3B*

3C1 [DATA] (WORD.INC)

3C2 APPLICATION = "WORD"
3C3 OBJECT1 = "MICROSOFT EXCEL WORKSHEET"
3C4 OBJECT2 = "MICROSOFT EXCEL CHART"
3C5 OBJECT4 = "MICROSOFT POWERPOINT PRESENTATION"

3C6 SPELLCHECKER = "TRUE"
3C7 SPELLTEST =
3C8     ##FOR [{WORD*}] = 1 to 5
3C9         spell ([{WORD*}]
3C10     ##NEXT 3C11 WORD1 = "supersede"
3C12 WORD2 = "qoph"
3C13 WORD3 = "pteridology"
3C14 WORD4 = "pantoffle"
3C15 WORD5 = "lassitude"

*Fig. 3C*

Sub Auto_Open()

Dim szTestDescription As String          'Holds description of test
Dim szApplicationName As String          'Holds name of an application program szTestDescription = "TESTSCRIPT"

szApplicationName = "WORD"
insert "MICROSOFT EXCEL WORKSHEET"
insert "MICROSOFT EXCEL CHART"
insert "MICROSOFT POWERPOINT SLIDE"
insert "MICROSOFT POWERPOINT PRESENTATION"
spell ("supersede")
spell ("qoph")
spell ("pteridology")
spell ("pantoffle")
spell ("lassitude")

METHOD AND SYSTEM FOR GENERATING TEST SCRIPTS

TECHNICAL FIELD

The present invention relates generally to a computer method and system for testing application programs, and, more specifically, to a method and system for generating test scripts to control the testing of application programs.

BACKGROUND OF THE INVENTION

Application programs have become increasingly more complex as they provide more and more features. As the complexity increases, the probability that an application program will have a programming error ("bug") increases dramatically. To reduce the probability of distributing an application program with a programming error, developers of application programs perform extensive testing. Because of the importance of thorough testing and because such testing can be very time-consuming, the application developers have developed extensive automated testing procedures.

Some conventional testing procedures involve first manually writing a test script (i.e., test program) and then using that test script to automatically test the application program. A test script specifies a sequence of events, such as a mouse move, a mouse click, a key up, or a key down, that represent actions that may be taken by a user of the application program to be tested. To test an application program, a testing engine reads the specification of events from the test script, and sends a simulation of the events to the application program to be tested. The application program receives the simulated event just as if a user had generated the event using a mouse or keyboard. A person testing the application program (i.e., a tester) can see how the application program processes the events and can determine whether the application program is functioning correctly.

Once a test script is developed, it can be reused to test and retest the same application program as long as the sequence of events that controls a function to be tested is not changed by the developer of the application program. Because each application program may use different sequences of events to control similar functions or may support very different functions, such a test script cannot typically be used to test other application programs. Thus, an application-specific test script needs to be developed for each application program.

Some application programs expose their functionality through macro languages that can also be used to test the exposed functionality. A user of the application program can develop a macro program to effect a desired behavior. For example, a user of a word processing program may develop a macro program that successively opens each file in a directory, prints the content of the opened file, and then closes the file. Although a macro program has traditionally supplied a simulated sequence of input events to effect a behavior, some application programs now expose their internal data structures (e.g., "objects" in object-oriented parlance) to the macro program.

To provide a consistent user interface, a developer of a family of application programs, referred to as an application suite, may use the same macro language to interface with each application program in the suite. The use of the same macro language makes it easier for a user to learn how to develop macro programs for each application program in the suite. Once a user learns the macro language, the user need only learn the commands necessary to control the exposed functionality. Also, since the application programs in an application suite are generally developed by the same developer who wants to present a consistent user interface throughout the application suite, the same sequence of events often control the same functionality in the different application programs. However, not all sequences of events are the same.

The application programs that provide a macro language can be tested using a test script written in the macro language. A tester can develop a macro program to test various functions of an application program and then request the application program to execute the macro program. Since application suites typically share functions and reuse much of the same code, it would be advantageous to use a single test script to test a particular function, regardless of which application in the suite is being tested. Unfortunately, because each application program may have different sets of commands to access the functions, each test script macro program can only be used to test the application program for which it was developed. It would be desirable to have a testing mechanism that would allow use of a single test script for different application programs, but that would allow for differences between the application programs.

SUMMARY OF THE INVENTION

The present invention is directed to a method and system for generating an application-specific test script. The application-specific test script contains test instructions for testing an application program. An output file generator receives an indication of a test template file that has test instructions that contain placeholders. The placeholders indicate where application-specific placeholder values are to be logically inserted into the test template file. The output file generator receives an ordered list of customizing files that have application-specific placeholder values. If a test instruction contains a placeholder, then the output file generator searches the customizing files according to the ordered list for a first placeholder value for the placeholder of the test instruction. When such a placeholder value is found, the output file generator inserts the placeholder value into the test instruction. The output file generator then stores the test instruction into the application-specific test script (i.e., output file). After the generating is complete, this application-specific test script can then be used to test the application.

In another aspect of the present invention, the output file generator receives a test template file that has statements that are test instructions or iterative commands, and that has placeholders. The placeholders indicate where application-specific placeholder values are to be logically inserted into the test template file. The iterative commands have iterative instructions with an iterative placeholder. For each iteration of an iterative command, the output file generator replaces the iterative placeholder with an indexed iterative placeholder, locates the placeholder in the customizing file, inserts an application-specific placeholder value for the indexed iterative placeholder, and stores the iterative instruction with the inserted placeholder value into the application-specific test script.

DETAILED DESCRIPTION OF THE INVENTION

The present invention provides a method and system for customizing an application-independent test template to generate an application-specific test script. In one embodiment, an output file generator inputs a test template and application-specific customizing files. The test template contains common instructions that can be used to test various application programs. The test template also contains placeholders that are to be replaced with application-specific data from the customizing files. Each application program has an associated customizing file that contains values to substituted for the placeholders in the test template. To generate an application-specific test script, the output file generator creates a file that contains the common instructions of the test template with the placeholders replaced with the values from the customizing file for that application program. The test template may also contain control commands (e.g., an if-then-else type command) that indicate which common instructions should be included in the generated test script. The instructions and control commands are referred to as statements of the test template. The application-specific test script can then be used to test the application program. In this way, application-independent instructions can be shared when testing and yet the testing can be customized to be application specific.

The customizing files for the application programs can be developed to inherit the placeholder values of other customizing files. This inheritance of the placeholder values of other customizing files allows for further sharing of testing instructions. For example, if a customizing file for a spreadsheet program is the same as a customizing file for a word processing program, except that the word processing program has placeholder values directed to testing a spell checker, then the customizing file for the word processing program can inherit the placeholder values from the customizing file for the spreadsheet program. In this way, a tester need not store the same placeholder values in multiple customizing files. Rather, the common placeholder values can be placed in a single customizing file that is inherited by other customizing files. In one embodiment, the inheritance of customizing files is indicated by providing an ordered list of customizing files to the output file generator. When generating an application-specific test script, the output file generator scans through the customizing files in order searching for a value for each placeholder. The output file generator selects as a placeholder value the first such value found. Thus, the placeholder value in a customizing file that is ordered before another customizing file effectively overrides any placeholder values in the other customizing files. Thus, a customizing file not only can share placeholder values from other customizing files, but also can override placeholder values in other customizing files. Consistent with inheritance terminology, a customizing file that is inherited may be referred to as a base customizing file and a customizing file that inherits another customizing file may be referred to as a derived customizing file.

The output file generator also allows the customizing files to contain placeholders within placeholder values. Thus, placeholder values can recursively contain placeholders. Whenever the output file generator replaces a placeholder with a placeholder value, it searches that placeholder value for any recursive placeholders and replaces any such placeholders that are found by searching through the customizing files.

The output file generator also can dynamically generate placeholders for a test script. For example, a tester may want to define a series of placeholders in a test template file with similar names. Such a tester may want to test 10 different functions of the application program with similar instructions except with different function names depending on the application program. The output file generator allows the tester to specify an iterative control command with an index and iterative statements with an indexed placeholder. The iterative statements can be instructions or control commands. For each iteration, the output file generator stores the iterative in the test script with the indexed placeholder replaced with a placeholder value from a customizing file. For example, the following is an example of an iterative command:

```
##FOR [{Function*}] = 1 to 10
    execute function*
##NEXT
```

The iterative control command is the ##FOR/##NEXT statement and the iterative statement is the instruction "execute function*" where "*" is the index and "function*" is the indexed placeholder. The output file generator processes the iterative control command as if the instructions "execute function1," "execute function2," and so on to wherein the template test script.

Figure 1:
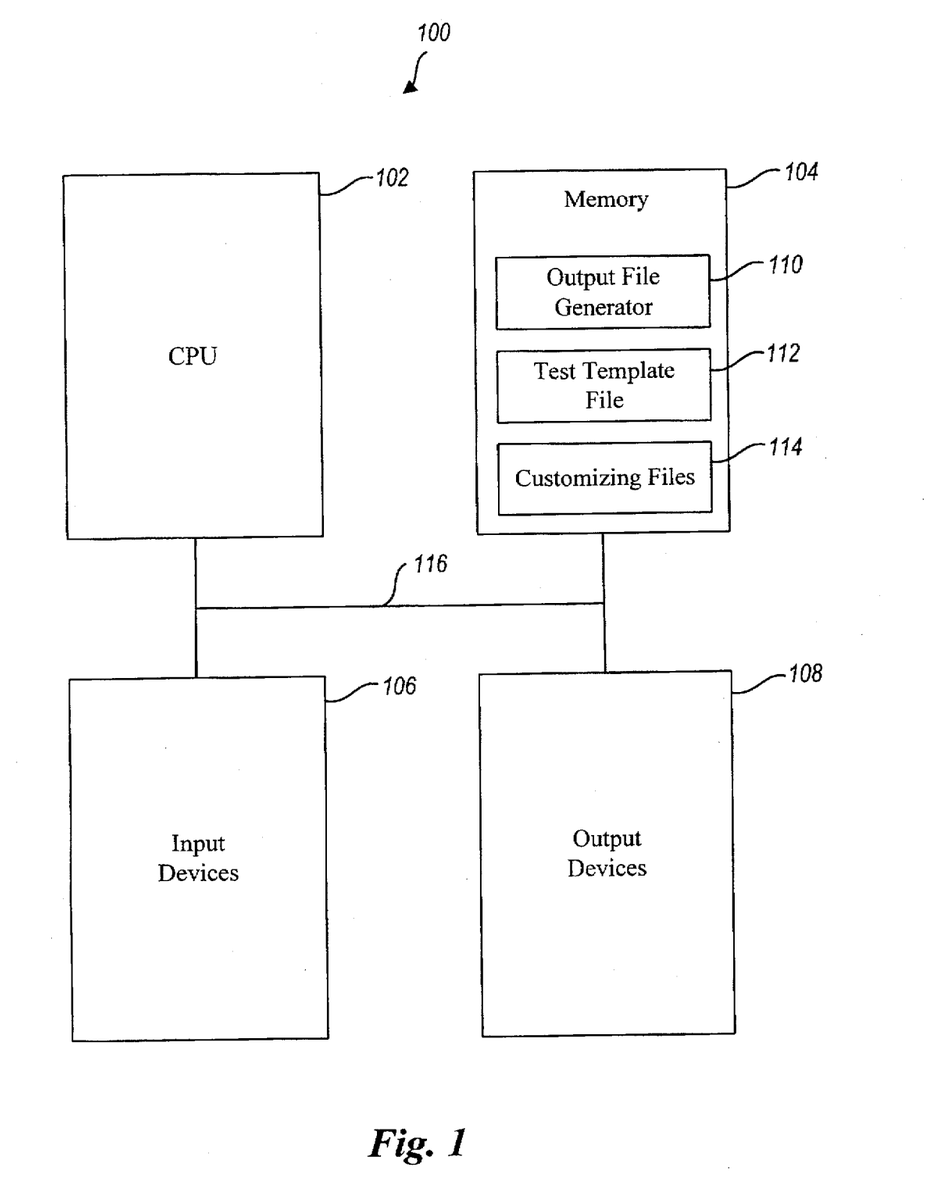
FIG. 1 illustrates an overview block diagram of an apparatus for generating test scripts in a preferred embodiment.

FIG. 1 illustrates an overview block diagram of an apparatus for generating test scripts in a preferred embodiment. The computer system 100 includes a CPU 102 and a memory 104. The memory includes an output file generator 110, a template test script 112, and customizing files 114. The computer system also includes input devices 106 and output devices 108. The input devices preferably include a keyboard and a mouse. The output devices preferably include a display device, such as a CRT. The CPU, memory, input devices, and output devices are interconnected by a bus 116. The output file generator may be stored as instructions on a computer-readable medium such as a disk.

Figure 2:
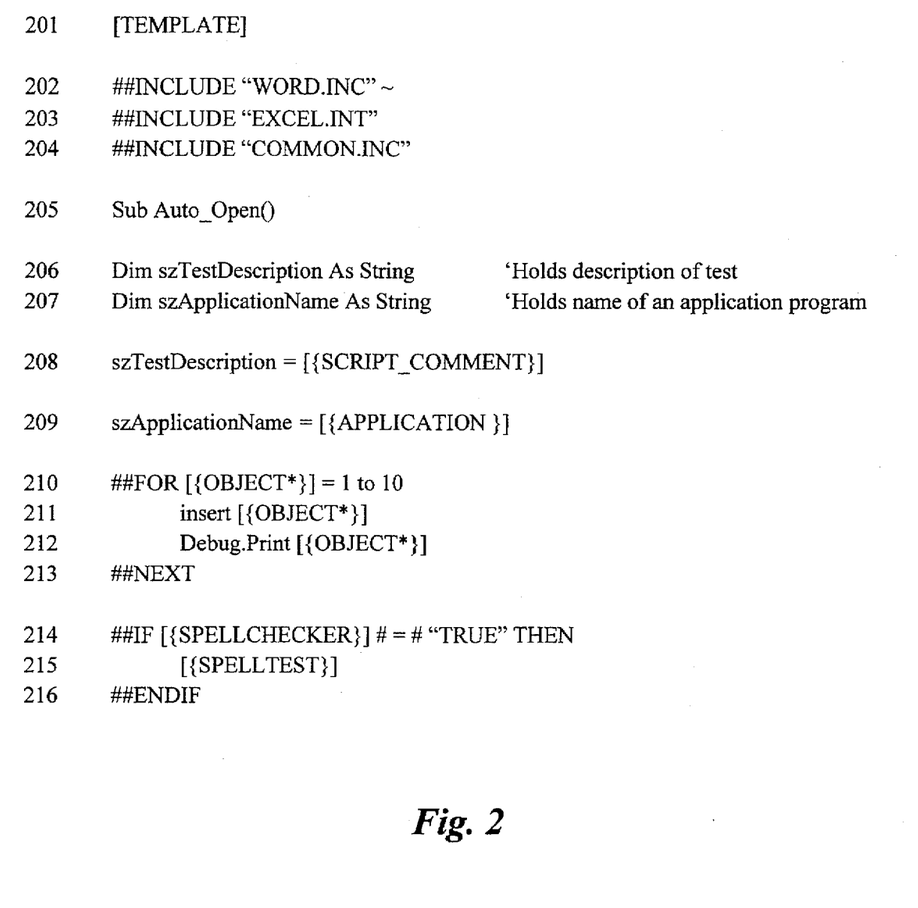
FIG. 2 illustrates a sample test template file.

FIG. 2 illustrates a sample test template file. The test template file contains a file type indicator, common macro instructions, control commands, and placeholders. The file type indicator 201 indicates that this file contains a template test script. In the example, the macro language is Visual Basic by Microsoft Corporation. The control commands 202–204, 210, 213, 214, and 216, are each prefixed with "##". These control commands direct the output file generator to include certain instructions in the application-specific test script based on the value for various placeholders. The placeholders are delineated by "[{" and "}]" and contain the name of the placeholder. A placeholder can be located in either an instruction or a control command.

The output file generator processes the test template file one statement at a time. When the output file generator encounters a control command, it replaces any placeholders in the command and performs the command. When the output file generator encounters an instruction, it replaces any placeholders and outputs the instruction as part of the application-specific test script. The output file generator replaces a placeholder by searching for a placeholder value with that placeholder in the ordered list of customizing files.

The following is a list of the control commands in one embodiment:

```
##INCLUDE
##IF/##ELSE/#ENDIF
##FOR/##NEXT
```

The ##INCLUDE command designates the ordered list of customizing files to be searched to find placeholder values. In this example, the template test script contains three ##INCLUDE commands 202–204, which indicate that the output file generator should search customizing files "WORD.INC," "EXCEL.INC," and "COMMON.INC" in that order. This ordering results in a type of inheritance in that the values in a customizing file override values for the same placeholder in other customizing files based on the ordering of the customizing files. A tester can alternatively designate an ordered list of customizing files by inputting the names of the customizing files directly into a user interface provided by the output file generator. Also, the customizing files can be designated by both the ##INCLUDE command and the user interface of the output file generator.

The ##IF command is a conditional command similar to the "if" statement of programming languages. The format of the ##IF command is:

```
##IF <data1>#=#<data2>THEN <data3>
##ELSE <data4>
##ENDIF
```

Each "<data#>" can be a placeholder, an instruction, or another control command. When the <data1> value equals the <data2> value, then the <data3> value is processed by the output file generator, else the <data4> value is processed by the output file generator. Generally, the <data3> and <data4> values are instructions that are stored in the application-specific test script. For example, in the ##IF command 214, if the value of the SPELLCHECKER placeholder is "TRUE," then output file generator evaluates the placeholder SPELLTEST, which contains instructions for testing the spellchecker.

The control commands can also include an iterative command. The iterative command allows placeholders to be dynamically generated in an iterative manner. The iterative command has the following format:

```
##FOR <placeholder*>=a TO b <statement> ##NEXT
```

The ##FOR command indicates that iteration statements follow. The ##NEXT indicates the end of the iteration statements that are to be repeated over the range of numerical values a to b. For each iteration of the iterative command, the indexed placeholder within the iteration statements is replaced by a placeholder with its asterisk (*) by a value starting with the value of a and sequentially increasing to the value of b. For example, for each iteration of the iterative commands 210, 213, the placeholder takes on the value OBJECT1, OBJECT2, OBJECT3, etc. The output file generator searches the customizing files for a values for the generated placeholders, replaces the generated placeholders with those values, and stores the instructions 211, 212 in the application-specific test script. In addition, "a" and "b" may be placeholders, in which case, their value would be retrieved from a customizing file prior to the evaluation of the ##FOR command.

Figure 3A:
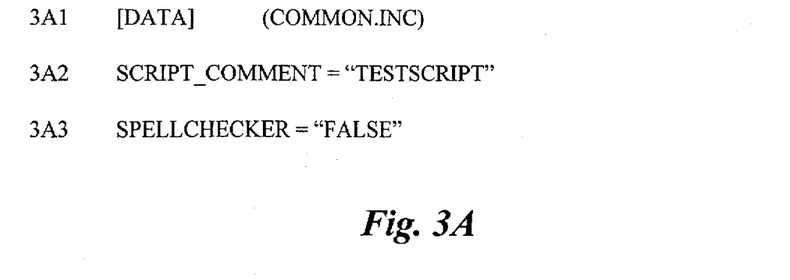
FIGS. 3A–3C illustrate customizing files.
Figure 3B:
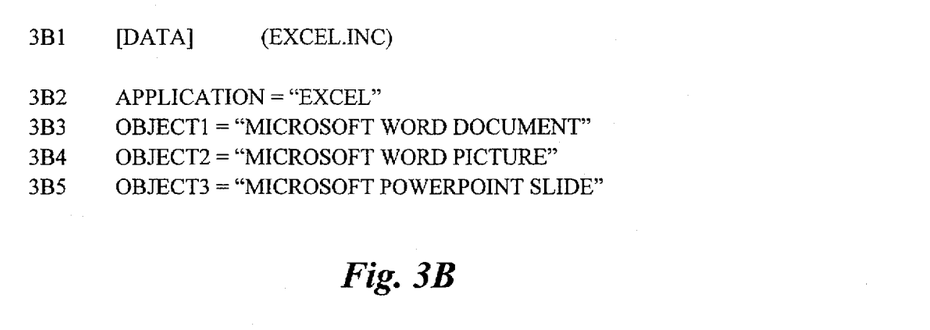
Figure 3C:
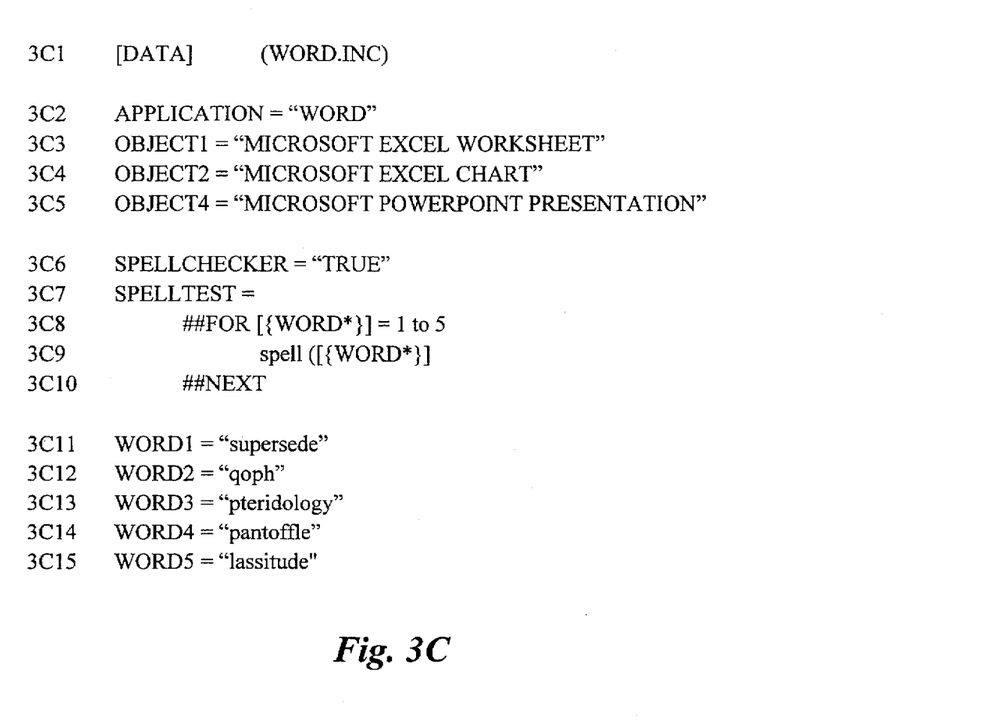

FIGS. 3A–3C illustrate the customizing files. FIG. 3A is the customizing file named "COMMON.INC." This file contains placeholder values that are common to each application program that is to be tested with a test script file generated from the template test script of FIG. 2. The placeholder "SPELLCHECKER" 3A3 is set to "FALSE" to indicate that the default is to generate a test script that does not test a spellchecker.

FIG. 3B is the customizing file named "EXCEL.INC." This file inherits the customizing file "COMMON.INC" (because of the ordering of the include commands in the template test script) and contains the placeholder values for generating a test script for the EXCEL application program. This file contains placeholder values "OBJECT1," "OBJECT2" and "OBJECT3" 3B3–3B4 for the iterative command.

FIG. 3C is the customizing file named "WORD.INC." This file inherits the customizing file EXCEL.INC and contains placeholder values that override inherited placeholder values and that define new placeholder values. The placeholder value for the placeholder SPELLCHECKER 3C6 overrides the placeholder value in the customizing file "COMMON.INC." The placeholder value for the placeholder SPELLTEST 3C7 recursively contains placeholders and contains an instruction and a control command. The file contains the values 3C11–3C15 for these placeholders.

Figure 4:
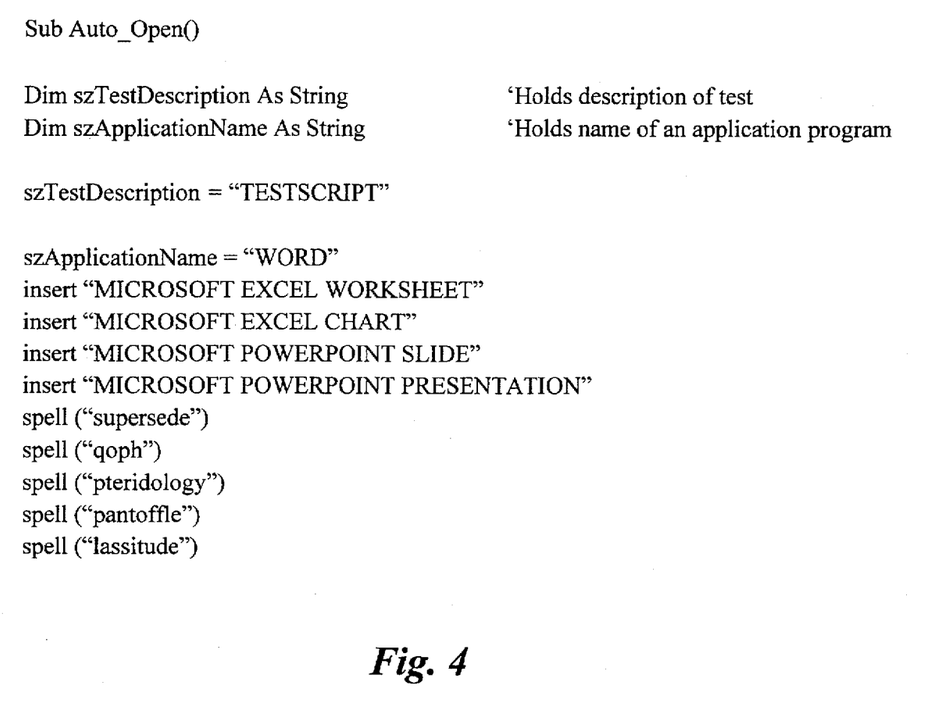
FIG. 4 illustrates the application-specific test script file generated from the template test script and the customizing files.

FIG. 4 illustrates the application-specific test script generated from the template test script and the customizing files.

Figure 5:
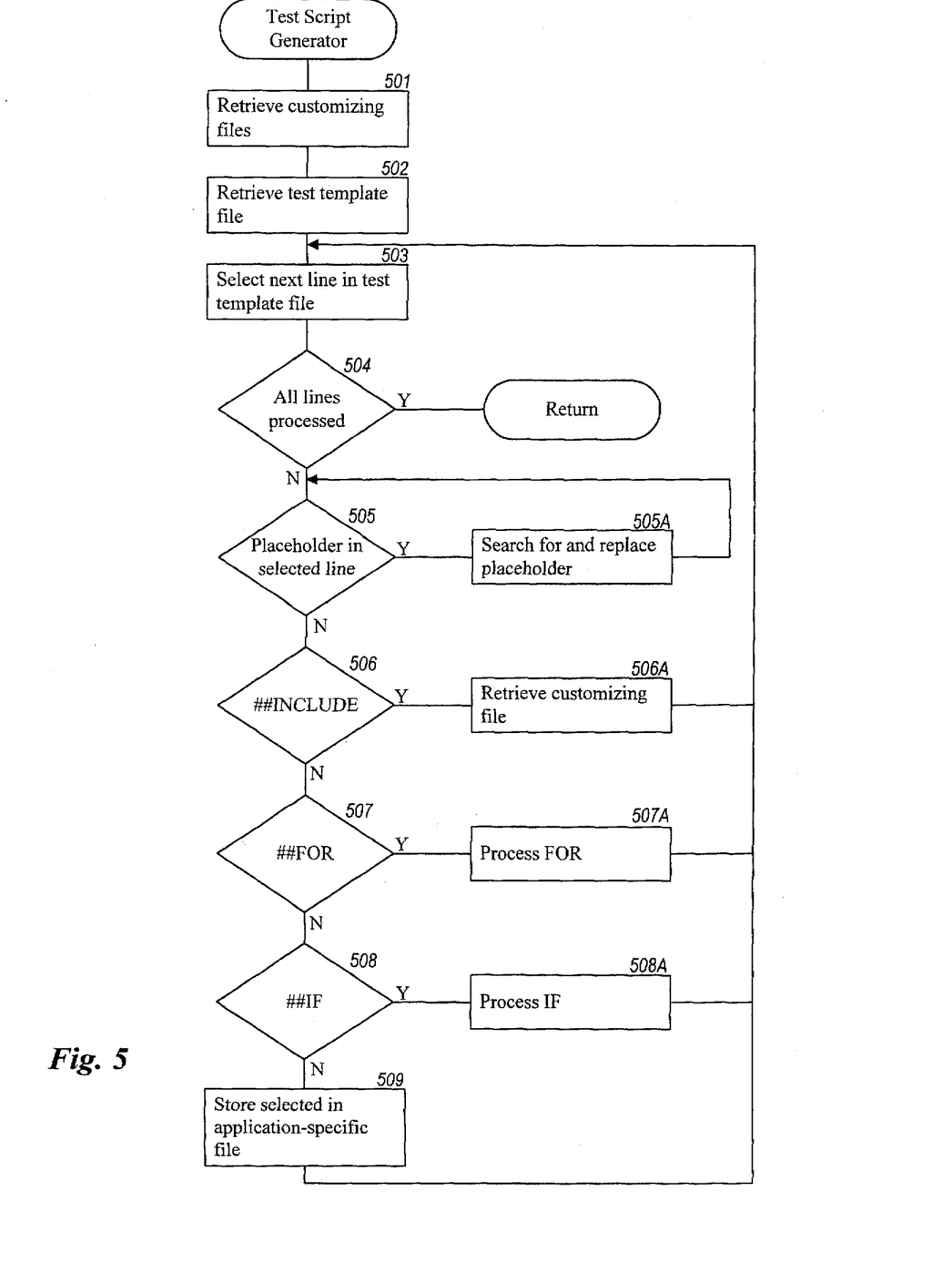
FIG. 5 is a flow diagram of an output file generator.

FIG. 5 is a flow diagram of an output file generator. The output file generator receives the names of customizing files either from a user or from the ##INCLUDE commands of the test template file. The output file generator also receives the name of the test template file. The output file generator creates a customized test script in accordance with the test script file and the customizing files. In step 501, the generator opens the customizing files indicated by the tester through the user interface. These customizing files are inherited by any of the customizing files indicated by the ##INCLUDE commands within the test template file. In step 502, the generator opens the test template file. In steps 503–508a, the generator loops processing each statement in the test template file. In step 503, the generator selects the next statement in the test template file starting with the first. In step 504, if all the statements have already been processed, then the generator is complete, else the generator continues at step 505. In step 505, if there is a placeholder in the selected statement, then the generator continues at step 505a, else the generator continues at step 506. In step 505a, the generator searches through the customizing files for the first occurrence of a placeholder value for the placeholder within the selected statement. The generator then replaces the placeholder with the selected placeholder value and loops to see if there are any more placeholder values in the selected statement. By looping to see if there are any other placeholder values in the selected statement, the generator effectively recursively replaces any placeholders within placeholder values. In step 506, if the selected statement is an ##INCLUDE command, then the generator continues at step 506a, else the generator continues at step 507. In step 506a, the generator opens the customizing file and links it into a list of customizing files to search for placeholder values and loops to step 503 to select the next statement in the template test script. In step 527, if the selected statement is a ##FOR command, then the generator continues at step 507a, else the generator continues at step 508. In step 507a, the generator processes the ##FOR command by logically adding to the template script file occurrences of the iterative statements with their index placeholders replaced with placeholder values and then loops to step 503 to select the first of the iterative statements. In step 508, if the selected statement contains the ##IF command, then the processing continues at step 508a, else the processing continues at step 509. In step 508a, the generator processes the ##IF command by determining if the condition is true and logically adding the appropriate statements to the test template file and loops to step 503 to select the first of the logically added statements. In step 509, the generator stores the selected line into the application-specific file and loops to step 503 to select the next statement from the template test script.

In an alternative embodiment, the present invention is used to generate a page on the WORLD WIDE WEB ("WEB page"). A WEB page typically includes graphics and is coded using hypertext markup language ("HTML"). Usually, when a user wishes to view a WEB page, the user requests that it be downloaded from a server, on which it resides, onto a local computer. Because the WEB page typically includes graphics, the downloading is time-consuming. Using the present invention, a template file for a WEB page is stored on the local computer, and customizing files are stored on the server. When a user wishes to view a WEB page, to save time, only the customizing files are downloaded. Then, the output file generator of the present invention generates a WEB page using the user-independent WEB page template file and the customizing data files. For example, the HTML template file might contain placeholders for stock price and volume data. The customizing files stored on the server contain the current price and volume information that would be inserted into the HTML output file (application-specific test script).

In another embodiment, the present invention is used to generate localized versions of a computer program (or more generally any document). The template file contains the computer program along with placeholders, and a customizing file for each country contains the language-specific (e.g., German and Japanese) string. The output file would contain the localized computer program.

Although the present invention has been described in terms of a preferred embodiment, it is not intended that the invention be limited by this embodiment. In particular, the generator of the present invention can be used to generate virtually any type of customized document. For example, the generator of the present invention could be used to generate resumes for different individuals from a user-independent resume template and user-specific customizing files. Also, the generator is particularly useful in generating documents that describe a test plan that is customized to an application. Also, one skilled in the art would appreciate that the term "file" refers to a collection of data that may or may not be a file system file. Modifications within the spirit of the present invention will be apparent to those skilled in the art. The scope of the present invention is defined in the claims that follow.

I claim:

1. A method in a computer system for generating an application-specific test script file, the application-specific test script file containing test instructions for testing an application program, the method comprising:

receiving a test template file, the test template file having test instructions that contain placeholders, the placeholders indicating where application-specific placeholder values are to be logically inserted into the test template file, each placeholder having a placeholder name;

receiving an ordered list of customizing files having application-specific placeholder values each with a corresponding placeholder name; and     for each test instruction in the test template file,
        when the test instruction contains a placeholder,
            searching the customizing files according to the ordered list for a first placeholder value with a corresponding placeholder name that matches the placeholder name of the placeholder of the test instruction; and
            when such a placeholder value is found, inserting the placeholder value into the test instruction; and
        storing the test instruction into the application-specific test script file.

2. The method of claim 1 wherein a plurality of the customizing files contain placeholder values for a placeholder and the ordering of the list results in a placeholder value overriding another placeholder value in another customizing file.

3. The method of claim 1 wherein the template script file contains control commands for controlling the generation of the application-specific test script file.

4. The method of claim 3 wherein the control commands include a command for indicating an ordered list of customizing files.

5. The method of claim 3 wherein the control commands include a command for iteratively generating test instructions with indexed placeholders.

6. The method of claim 1 wherein after a placeholder value is inserted into the test instruction, determining whether the inserted placeholder value contains placeholders.

7. A method in a computer system for generating an application-specific test script file, the application-specific test script file containing test instructions for testing an application program, the method comprising:

receiving a test template file, the test template file having statements that are test instructions or iterative commands, and having placeholders, the placeholders indicating where application-specific placeholder values are to be logically inserted into the test template file, the iterative command having an iterative instruction with an iterative placeholder; and     for each statement in the test template file,
        when the statement is the iterative command,
            for each iteration of the iterative command,
                replacing the iterative placeholder with an indexed iterative placeholder within the iterative instruction;
                inserting an application-specific placeholder value for the indexed iterative placeholder within the iterative instruction; and
                storing the iterative instruction with the inserted placeholder value into the application-specific test script file.

8. The method of claim 7 wherein the inserting of an application-specific placeholder value includes searching an ordered list of customizing files for a first placeholder value for the indexed iterative placeholder.

9. A method of generating a customized output file comprising:

creating a template file having data with placeholders;

creating a derived customizing file having placeholder values for placeholders, wherein the derived customizing file inherits a base customizing file having placeholder values for placeholders; and     for each placeholder within the template file,
        when the derived customizing file has a placeholder value for the placeholder, replacing the placeholder with the placeholder value from the derived customizing file; and when the derived customizing file does not have a placeholder value for the placeholder, replacing the placeholder with a placeholder value from the base customizing file so that the derived customizing file can share the placeholder values of the base customizing file.

10. The method of claim 9 wherein the customized output file is an application-specific test script.

11. The method of claim 9 wherein the customized output file is a WEB page, wherein the template file is stored on a local computer, and wherein the customizing files are downloaded from a server computer to the local computer.

12. The method of claim 9 wherein the customized output file is a localized version of a computer program and wherein the customizing files contain language-specific data.

13. The method of claim 9 wherein the base and derived customizing files are specified in an ordered list of customizing files.

14. The method of claim 9 wherein the template file contains a control command for iteratively generating data for the customized output file.

15. The method of claim 14 wherein the generated data includes placeholders that are replaced by placeholder values.

16. A method of generating a customized output file, the method comprising:

receiving a template file having statements with an iterative command, the iterative command indicating a number of iterations and having an iterative instruction with an indexed placeholder;

receiving a customizing file having placeholder values for iterative placeholders; and for each of the number of iterations in the iterative command, replacing the indexed placeholder within the iterative instruction with a placeholder value from the customizing file based on the iteration number; and adding the iterative instruction with the replaced iterative placeholder to the customized output file.

17. The method of claim 16 wherein the customized output file is an application-specific test script.

18. The method of claim 16 wherein the customized output file is a WEB page, wherein the template file is stored on a local computer, and wherein the customizing file is received from a server computer at the local computer.

19. The method of claim 16 wherein the customized output file is a localized version of a computer program and wherein the customizing file contains language-specific data.

20. The method of claim 16 including receiving a plurality of customizing files wherein the replacing of the indexed placeholder is based on inheritance of the customizing files.

21. A computer-readable medium containing instructions for causing a computer system to generate an output file by:

receiving a template file having data with placeholders;

receiving an ordered list of customizing files having placeholder values; and for each placeholder in the data, searching the customizing files according to the ordered list for a first placeholder value for the placeholder;

when such a placeholder value is found, inserting the placeholder value into the data; and storing the data with the inserted placeholder as part of the output file whereby the searching of the customizing files effects inheritance of customizing files.

22. A computer-readable medium of claim 21 wherein a plurality of the customizing files contain placeholder values for a placeholder and the ordering of the list results in a placeholder value overriding another placeholder value in another customizing file.

23. The computer-readable medium of claim 21 wherein the template file contains control commands for controlling the generation of the output file.

24. The computer-readable medium of claim 23 wherein the control commands include a command for indicating an ordered list of customizing files.

25. The computer-readable medium of claim 23 wherein the control commands include a command for iteratively generating data with indexed placeholders.

26. The computer-readable medium of claim 21 wherein after a placeholder value is inserted into the data, determining whether the inserted placeholder value contains placeholders to effect recursion of placeholders.

27. The computer-readable medium of claim 23 wherein the control commands include a command for indicating to selectively process portions of the template file based on evaluation of a test condition in the command.

28. A computer-readable medium containing instructions for causing a computer system to generate an application-specific test script file, the application-specific test script file containing test instructions for testing an application program, by:

receiving a test template file, the test template file having statements that are test instructions or iterative commands and having placeholders, the placeholders indicating where application-specific placeholder values are to be logically inserted into the test template file, the iterative command having an iterative instruction with an iterative placeholder; and for each iteration of each iterative command in the test template file, replacing the iterative placeholder of the iterative command with an indexed iterative placeholder within the iterative instruction;

inserting an application-specific placeholder value for the indexed iterative placeholder within the iterative instruction; and adding the iterative instruction with the inserted placeholder value to the application-specific test script file.

29. The computer-readable medium of claim 28 wherein the inserting of an application-specific placeholder value includes searching an ordered list of customizing files for a first placeholder value for the indexed iterative placeholder.

30. A computer system for generating an application-specific test script comprising:

a test template file having test instructions with placeholders;

a derived customizing file having placeholder values for placeholders, wherein the derived customizing file inherits a base customizing file having placeholder values for placeholders; and an output file generator that replaces the placeholder with the placeholder value from the derived customizing file when the derived customizing file has a placeholder value for the placeholder and replaces the placeholder with a placeholder value from the base customizing file so that the derived customizing file can share the placeholder values of the base customizing file when the derived customizing file does not have a placeholder value for the placeholder.

31. A computer system for generating a test script comprising:

a test template file having statements with an iterative command, the iterative command indicating a number of iterations and having an iterative instruction with an indexed placeholder;

a customizing file having placeholder values for iterative placeholders; and an output file generator that, for each of the number of iterations in the iterative command, replaces the indexed placeholder within the iterative instruction with a placeholder value from the customizing file based on the iteration number and adds the iterative instruction with the replaced iterative placeholder to the test script.

* * * * *